(12) United States Patent
Fornes

(10) Patent No.: US 7,226,137 B2
(45) Date of Patent: Jun. 5, 2007

(54) STOP PIN FOR TRACK TENSION ASSEMBLY

(75) Inventor: Corey L. Fornes, Lisbon, ND (US)

(73) Assignee: Clark Equipment Company, Montvale, NJ (US)

( * ) Notice: Subject to any disclaimer, the term of this patent is extended or adjusted under 35 U.S.C. 154(b) by 223 days.

(21) Appl. No.: 10/985,090

(22) Filed: Nov. 10, 2004

(65) Prior Publication Data

US 2006/0097571 A1   May 11, 2006

(51) Int. Cl.
 *B62D 55/32* (2006.01)
 *B62D 55/30* (2006.01)
(52) U.S. Cl. ............... 305/143; 305/153; 180/9.52
(58) Field of Classification Search ........ 305/143, 305/144, 145, 153, 154, 60; 180/9.1, 9.5, 180/9.52
See application file for complete search history.

(56) References Cited

U.S. PATENT DOCUMENTS

| | | | |
|---|---|---|---|
| 2,054,533 A | 9/1936 | Baker et al. | |
| 2,452,671 A * | 11/1948 | Merrill | 180/9.23 |
| 2,506,619 A | 5/1950 | Schwartz | |
| 2,683,064 A | 7/1954 | Land | 305/9 |
| 2,716,577 A | 8/1955 | Land | |
| 2,717,813 A | 9/1955 | Gardner | |
| 2,837,379 A | 6/1958 | Selyem et al. | 305/9 |
| 2,926,969 A * | 3/1960 | Ashley, Jr. | 180/9.52 |
| 3,082,043 A | 3/1963 | Orton | 305/10 |
| 3,101,977 A | 8/1963 | Hyler et al. | 305/10 |
| 3,477,766 A | 11/1969 | Linsay | 305/10 |
| 3,549,213 A | 12/1970 | Smith et al. | |
| 3,647,270 A | 3/1972 | Althaus | 305/10 |
| 3,744,857 A * | 7/1973 | Schoonover | 305/145 |
| 3,787,097 A | 1/1974 | Orr | 305/10 |
| 3,901,563 A | 8/1975 | Day | 305/10 |
| 3,915,509 A | 10/1975 | Bell et al. | 305/10 |
| 3,915,510 A | 10/1975 | Alexander | |
| 3,920,286 A | 11/1975 | Bell | |
| 3,953,085 A | 4/1976 | Randour | |
| 4,018,295 A | 4/1977 | Hasselbacher | |

(Continued)

FOREIGN PATENT DOCUMENTS

JP   04019285   1/1992

(Continued)

OTHER PUBLICATIONS

European Search Report and Written Opinion dated Mar. 20, 2006 for International Application No. PCT/US2005/039028, filed Oct. 28, 2005.

*Primary Examiner*—Russell D. Stormer
(74) *Attorney, Agent, or Firm*—Michael Best & Friedrich LLP

(57) ABSTRACT

A track tensioning assembly for a track laying vehicle. The track tensioning assembly includes an idler plate assembly coupled to a hydraulic actuator at a first end and coupled to a front idler assembly at a second end. The hydraulic actuator is configured to apply a pressure on the front idler assembly with the idler plate assembly to achieve a desired tautness. The track tensioning assembly also includes a removable cross pin positioned to prevent loosening of track while in a first location or configured to allow removal of tracks while in a second location.

19 Claims, 8 Drawing Sheets

U.S. PATENT DOCUMENTS

| | | |
|---|---|---|
| 4,088,377 A | 5/1978 | Corrigan |
| 4,149,757 A | 4/1979 | Meisel, Jr. .................... 305/10 |
| 4,406,501 A | 9/1983 | Christensen |
| 4,413,862 A | 11/1983 | Ragon ......................... 305/10 |
| 4,457,564 A | 7/1984 | Ruge et al. .................... 305/10 |
| 4,545,624 A | 10/1985 | Van Ooyen .................... 305/9 |
| 4,580,850 A | 4/1986 | Bissi et al. |
| 4,681,376 A | 7/1987 | Riml ............................. 305/10 |
| 4,874,052 A | 10/1989 | Purcell et al. ............... 180/9.1 |
| 4,893,883 A | 1/1990 | Satzler ......................... 305/10 |
| 5,191,951 A * | 3/1993 | Bargfrede et al. ........... 180/9.1 |
| 5,316,381 A | 5/1994 | Isaacson et al. .............. 305/10 |
| 5,334,106 A | 8/1994 | Purcell ....................... 474/110 |
| 5,515,936 A * | 5/1996 | Lagace ........................ 180/9.1 |
| 5,738,421 A | 4/1998 | Neymans et al. ........... 305/144 |
| 5,984,436 A | 11/1999 | Hall ............................ 305/145 |
| 6,001,036 A | 12/1999 | O'Brien et al. ............. 474/110 |
| 6,224,172 B1 | 5/2001 | Goodwin .................... 305/145 |
| 6,244,172 B1 | 6/2001 | Holmberg et al. |
| 6,322,171 B1 | 11/2001 | Fornes |
| 6,761,236 B2 * | 7/2004 | Hibbert ...................... 180/9.52 |
| 6,869,153 B2 * | 3/2005 | Wright et al. ............... 305/169 |

FOREIGN PATENT DOCUMENTS

| | | | |
|---|---|---|---|
| JP | 4-133883 | * | 5/1992 |
| JP | 2000085647 | | 3/2000 |

* cited by examiner

STOP PIN FOR TRACK TENSION ASSEMBLY

BACKGROUND OF THE INVENTION

The present invention relates to a track laying vehicle. In particular, the present invention relates to a track tensioning assembly.

Track laying vehicles include a pair of tracks which revolve about track frames to move the vehicle forward and backward. Such vehicles are steered by causing the tracks to revolve at different speeds or proceed straight forward by causing the tracks to revolve at the same speed.

Track laying vehicles have been well known for years and generally employ a driving force to cause the tracks to revolve about their track frames and generally employ a track tensioning assembly to keep the revolving tracks at a desired tautness. A driving force is transmitted to a track by a track driving sprocket. A sprocket or guide roller will guide the track in a path of movement as it is driven and provide tension in the track in combination with the track tensioning assembly. The track tensioning assembly includes at least one idler roller which normally supports the track and is coupled to a movable idler assembly. The movable idler assembly is coupled to a device that applies pressure to the idler assembly. For example, the device can include springs, threaded adjusters, hydraulic actuators and the like.

In some instances, however, it is possible that the track tensioning assembly does not provide enough tautness to the tracks in a track laying vehicle. The tracks can become loose enough such that the track will jump a cog on the drive sprocket or the track will roll off the idler roller during operation. In a machine equipped with hydraulically tensioned tracks, the track can become loose during absence of hydraulic circuit pressure in the track tensioning assembly when the track laying vehicle is not operating. For example, the track laying vehicle can lose hydraulic circuit pressure if it is parked on a steep grade or being towed.

There is a need for an improved track tensioning assembly in a track laying vehicle that overcomes one or more of the above-described limitations, or other limitations not described. A track tensioning assembly that addresses these deficiencies would be particularly advantageous.

SUMMARY OF THE INVENTION

A track tensioning assembly for a track laying vehicle is provided. The track laying vehicle includes a track and a track frame having a pair of side plates. The track tensioning assembly includes an idler plate assembly coupled to a hydraulic actuator at a first end and coupled to a front idler assembly at a second end. The hydraulic actuator is configured to apply a pressure on the front idler assembly with the idler plate assembly. The track tensioning assembly also includes a removable cross pin located in a track retaining position on the track frame. The removable cross pin is configured to prevent complete loosening of the track if hydraulic tensioning is lost.

In another embodiment, a track tensioning assembly includes an idler plate assembly coupled to a hydraulic actuator at a first end and coupled to a front idler assembly at a second end. The hydraulic actuator is configured to apply a pressure on the front idler assembly with the idler plate assembly. In this embodiment, track tensioning assembly includes a removable cross pin located in a track removing position on the track frame. The removable cross pin is configured to allow removal of the track in the track removing position. In this position, hydraulic pressure can be applied and the front idler assembly will remain in the track removal position.

DETAILED DESCRIPTION OF THE PREFERRED EMBODIMENTS

Figure 1:
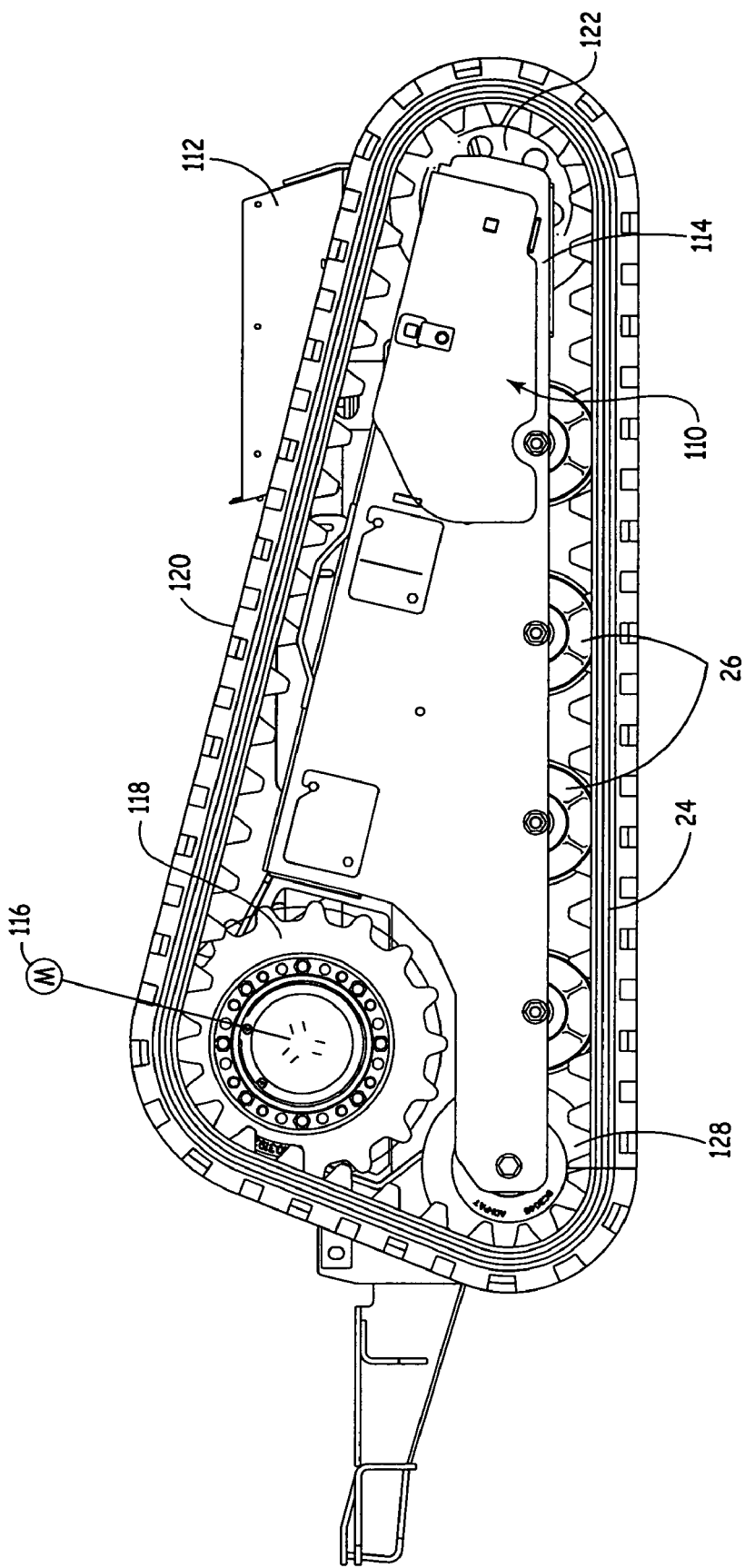
FIG. 1 illustrates a partial side elevation view of a track laying vehicle.

FIG. 1 illustrates a partial side elevation view of a track laying vehicle in accordance with an embodiment of the present invention. It should be noted that there are tracks located on each side of the vehicle, wherein the second track, not shown in FIG. 1, is a mirror image of the one shown. The vehicle in FIG. 1 can be a utility loader or other type of track laying vehicle. The following is a description of the track, however, those skilled in the art should recognize that other configurations are possible.

A track frame, indicated generally at 110, is supported on a vehicle frame 112. The track frame has a pair of side plates 114, and as shown, a drive motor 116 is mounted to track frame 110. An output shaft of motor 116 has a drive sprocket 118 drivably mounted thereon. Drive sprocket 118, in the form shown, is at the upper side of the track frame 110, and an endless drive track shown at 120 extends downwardly in a forward direction from the drive sprocket 118 to a front idler roller 122.

Rear roller 128 is rotatably mounted on track frame 110, and guides the track so that there is a ground engaging lower length section, indicated at 124, that is supported on bogie wheels or track rollers 126 of a conventional or any preferred design. The track 120, which is an endless track, is passed around a tensioning or idler roller 122, which is mounted onto a track tensioning assembly (not shown in FIG. 1).

Figure 2:
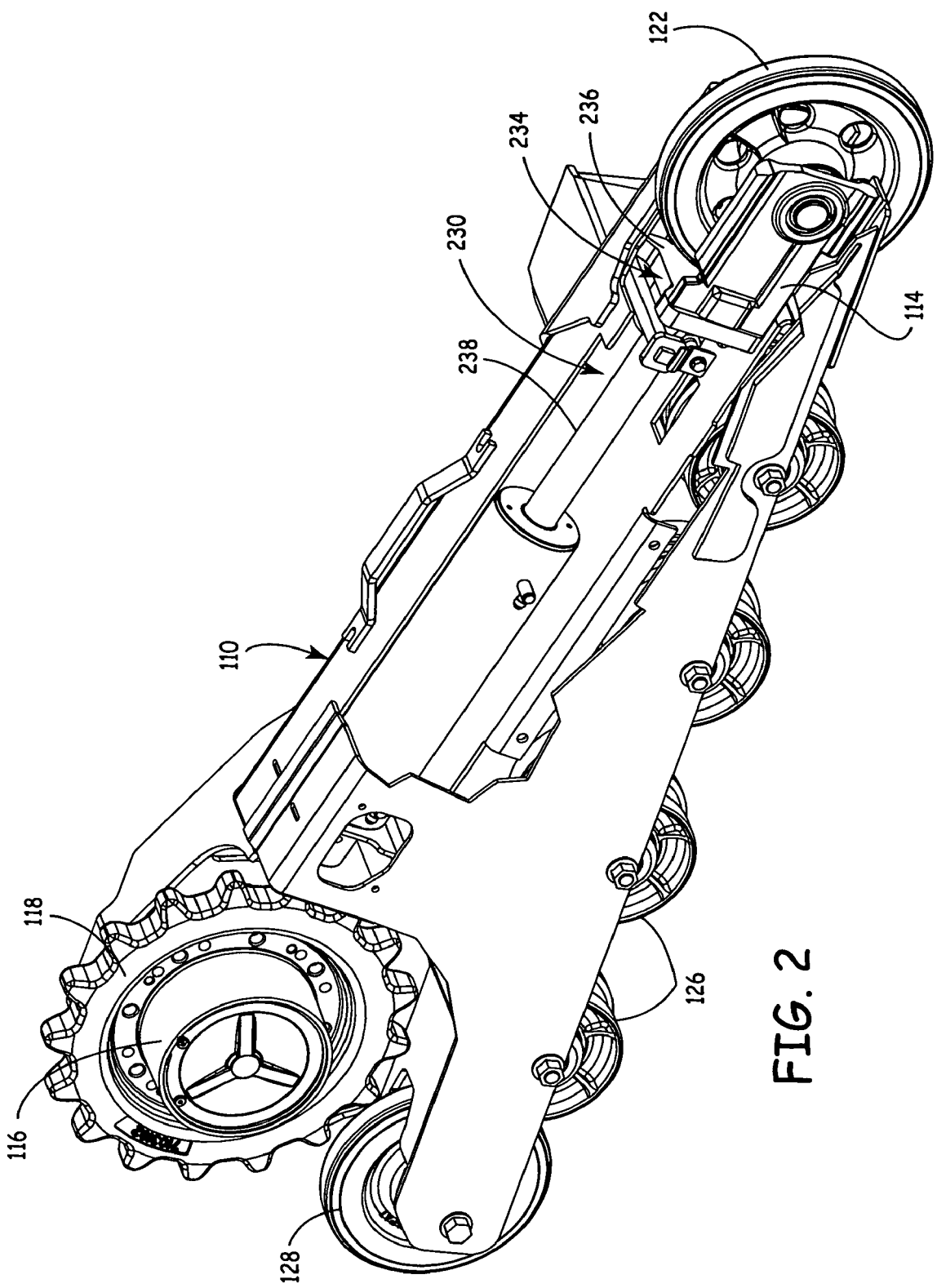
FIG. 2 illustrates a fragmentary perspective view of a portion of a track tensioning assembly positioned on a track frame.
Figure 3:
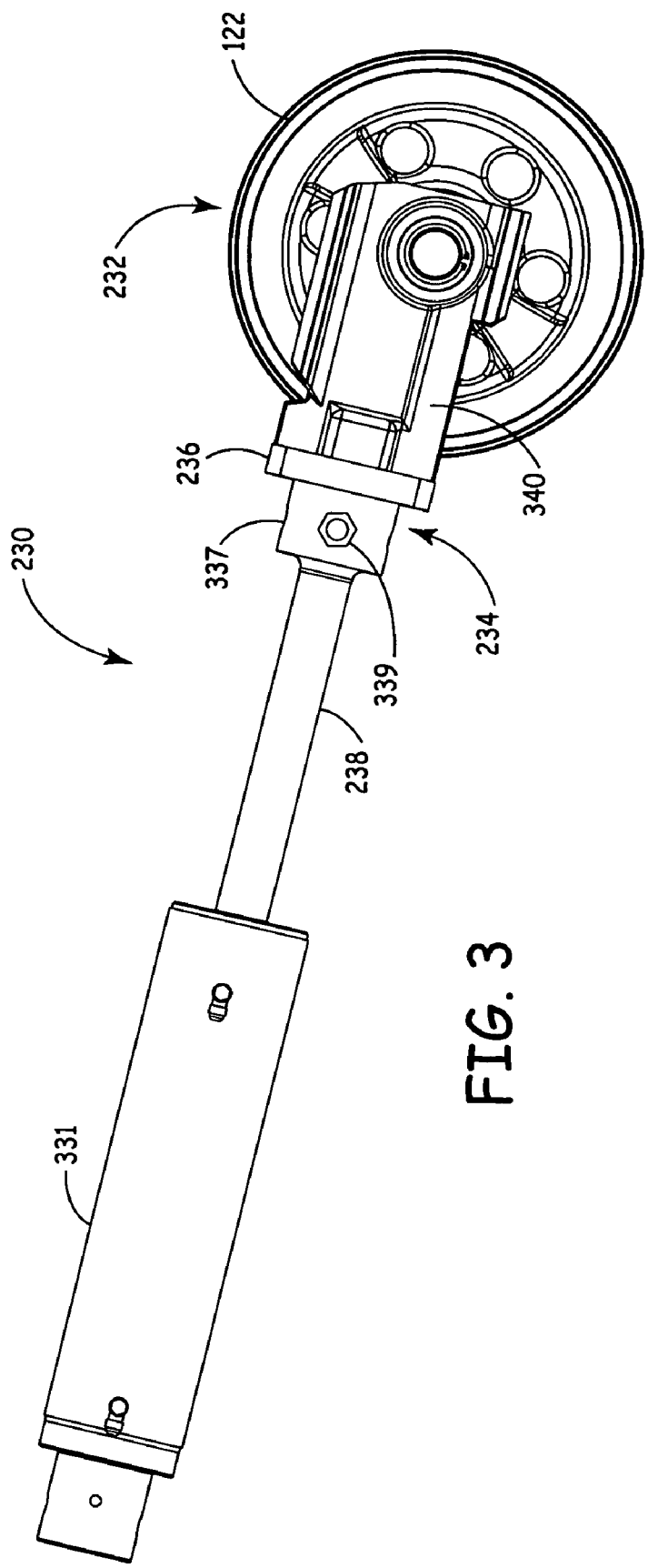
FIG. 3 illustrates a side view of a track tensioning assembly.

FIG. 2 illustrates a fragmentary perspective view of a portion of a track tensioning assembly 230 positioned on track frame 110 in accordance with an embodiment of the present invention. FIG. 3 illustrates a side view of track tensioning assembly 230 in accordance with an embodiment of the present invention. The following discusses both FIGS. 2 and 3. Track tensioning assembly 230 includes a hydraulic tensioning cylinder or actuator 331 (shown in FIG. 3), a front idler assembly 232 including a front idler roller 122 and an idler plate assembly 234. Idler plate assembly 234 includes an idler plate 236, a tube portion 337 and a cross bolt 339. Idler plate assembly 234 is coupled to a rod 238 of hydraulic cylinder 331 at one end and coupled to a pair of guide plates 340 of front idler assembly 232 at the other end.

Front idler assembly 232 is forced against idler plate assembly 234 by the track. However, side plates 114 of track frame 110 confine front idler assembly 232 to move lengthwise while hydraulic cylinder 331 actuates rod 238 and idler plate assembly 234 to apply pressure to idler roller 122 in order to maintain proper tension on track 120 (FIG. 1).

Figure 4:
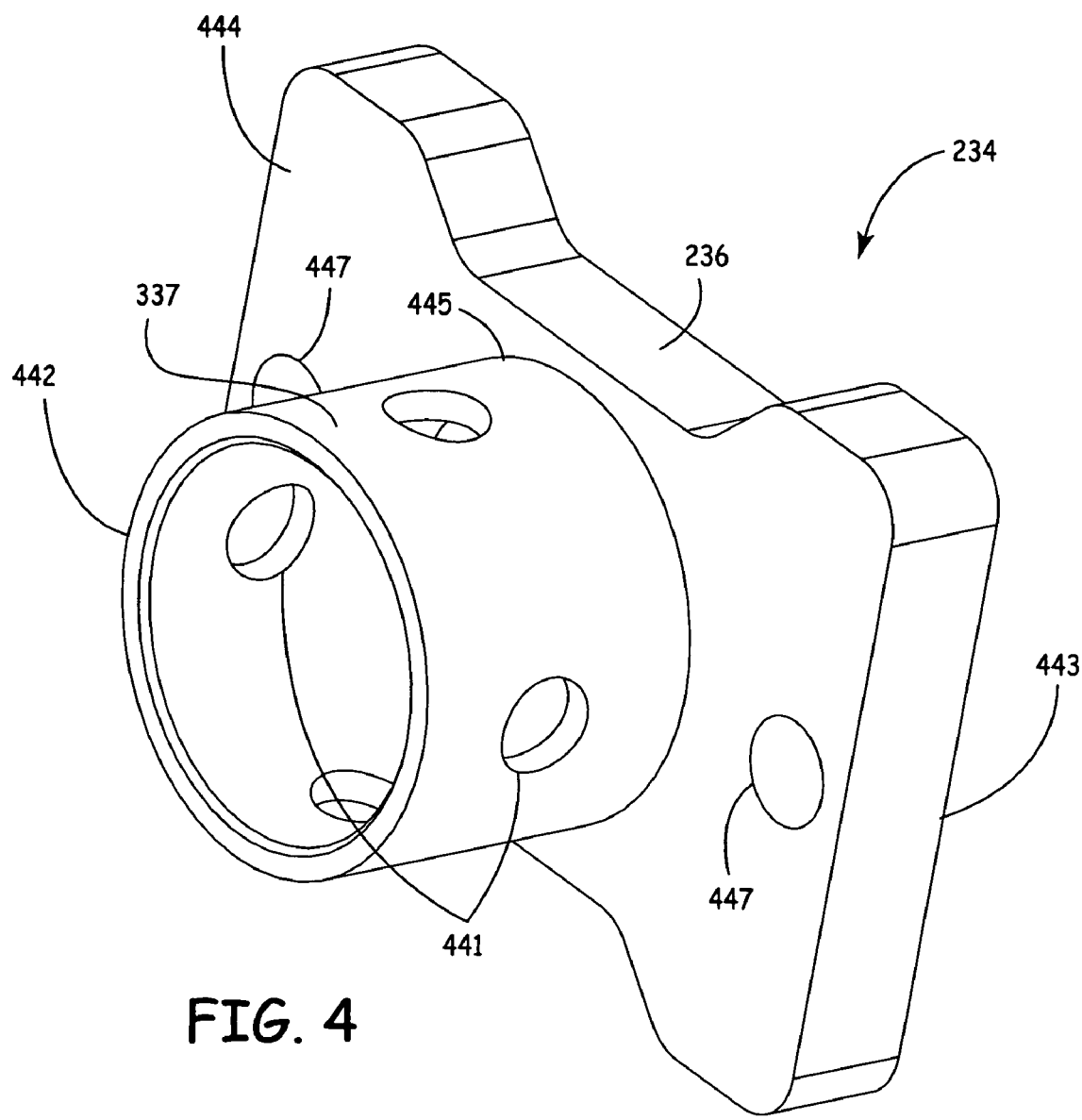
FIG. 4 illustrates a detailed perspective view of an idler plate assembly.

FIG. 4 illustrates a detailed perspective view of idler plate assembly 234 in accordance with an embodiment of the present invention. Idler plate assembly 234 includes first end 442 and a second end 443. An idler plate 236 is positioned at second end 443 and tube portion 337 is positioned at a first end 442. Tube portion 337 is configured to engage rod 238 (FIGS. 2 and 3). The end of rod 238 loosely fits into tube portion 337 and is held in place by cross bolt 339 (FIG. 3) through oversized cross holes 441. The loosely held rod end works around inside tube portion 337 to assist in removing debris that could be deposited in the tube portion. Cross holes 441 not used by cross bolt 339 further assist in debris removal. Idler plate 236 includes a back end 444 that is coupled to tube portion 337. Back end 444 of idler plate 236 forms a shoulder 445 with tube portion 337. Idler plate 236 is configured to couple to guide plates 340. Pins (not shown) in guide plates 340 fit into holes 447 of idler plate 236.

Figure 5:
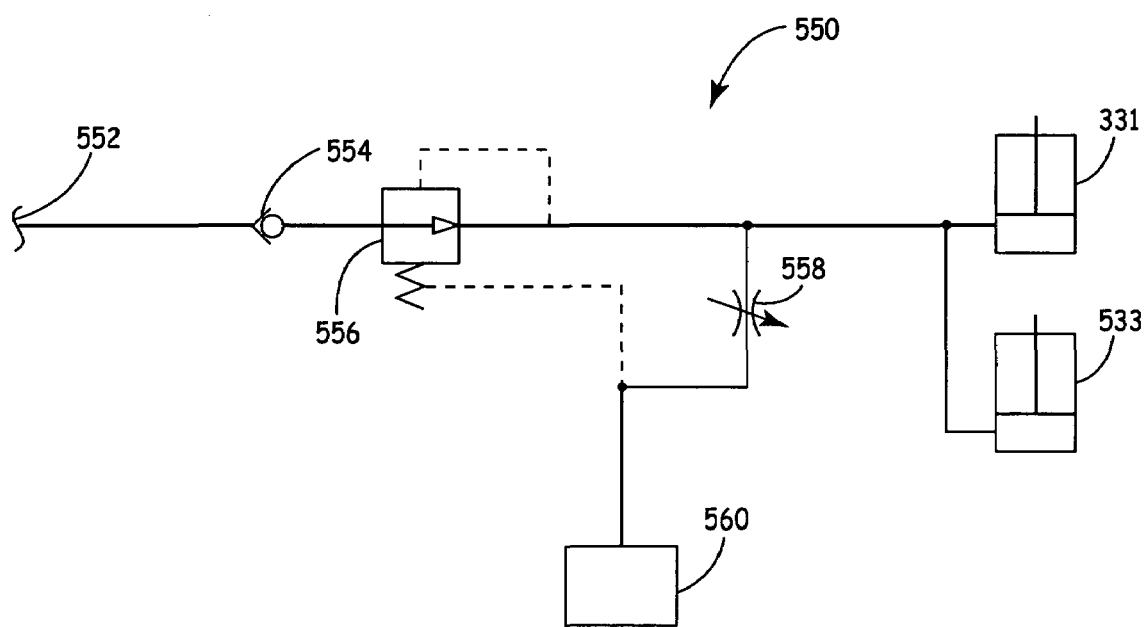
FIG. 5 illustrates a hydraulic track tensioning circuit.

Hydraulic cylinder 331 (FIG. 3) is controlled by a hydraulic track tensioning circuit 550 as illustrated schematically in FIG. 5. Hydraulic track tension circuit 550 includes a feed 552 containing pressurized fluid from a pump. Feed 552, under pressure, passes through a check valve 554 and pressure reducing/relieving valve 556 and charges the track tensioning cylinders 331 (also illustrated in FIG. 3) and 533. Hydraulic cylinders 331 and 533 are connected in parallel to circuit 550 and each cylinder (331 or 533) is located on its respective track frame of a track laying vehicle. A piston in each cylinder is subjected to pressure for extending each rod included in each cylinder, such as rod 238 illustrated in FIGS. 2 and 3. Pressure reducing/relieving valve 556 is set such that the cylinders 331 and 533 will be provided with a maximum limiting pressure to limit the force exerted by the cylinders and thus limit the track tension. If the track tension exceeds a certain set level, the pressure on the base end of the cylinders rises and reducing/relieving valve 556 opens. The track tension is at a maximum at this pressure level. If the pressure on the base ends of the cylinders drop, reducing/relieving valve 556 closes.

A manual valve 558 is provided to relieve pressure in cylinders 331 and 533 for track removal. When manual valve 558 is opened, idler assembly 232 can be moved back to force cylinder rod 238 into cylinder 331 and to force oil to drain to tank 560.

Figure 6:
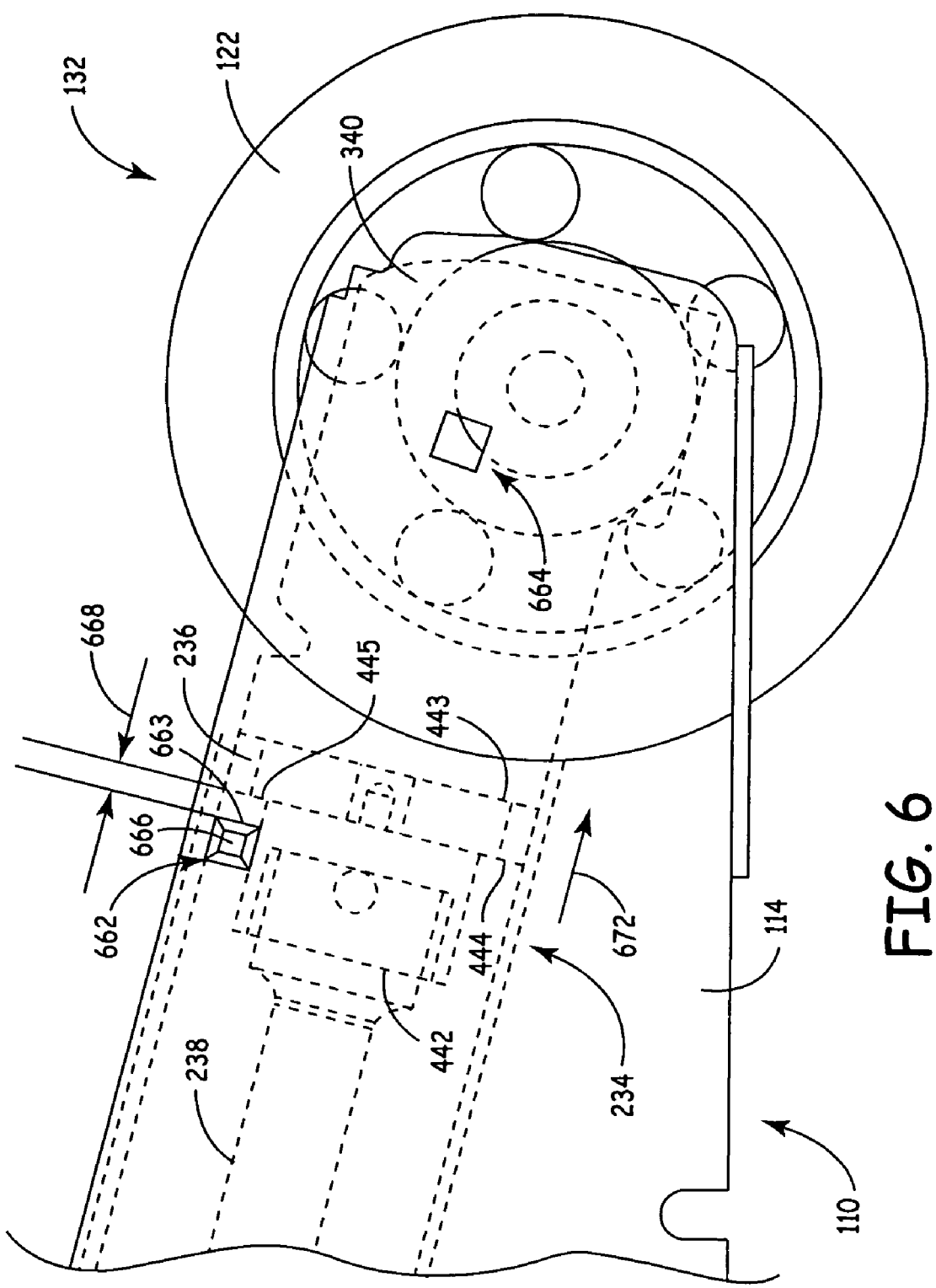
FIG. 6 illustrates an enlarged side schematic view of a front idler assembly and an idler plate assembly.

FIG. 6 illustrates an enlarged side schematic view of front idler assembly 232 and idler plate assembly 234 supported on side plates 114 of track frame 110 in accordance with an embodiment of the present invention. Front idler assembly 232 includes idler roller 122 and a pair of guide plates 340. Idler plate assembly 234 includes idler plate 236 coupled to cylinder rod 238 at first end 442 and coupled to guide plates 340 of the front idler assembly 132 at second end 443.

In accordance with an embodiment of the present invention, track frame 110 includes a first cross pin location or track retaining position 662 and a second cross pin location or track removing position 664. One of the side plates 114 includes a first aperture 663 and the other of the side plates 114 includes a second aperture (not shown). A cross pin 666 is installed in first aperture 663 and the second aperture at first cross pin location 662 when track laying vehicle is either in operation or not in operation. Inserting cross pin 666 in first aperture 663 and the second aperture restricts the tracks from completely loosening during operation as well as keeps the tracks on track frame 110 if the track laying vehicle is not operating. Loosening of tracks during operation can cause a track to jump a cog on a drive sprocket, such as drive sprocket 118 illustrated in FIG. 1. Loosening of tracks can also cause a track to roll off front idler tensioning roller 122 or a roller, such as rear roller 128 illustrated in FIG. 1. Having stop pin 666 installed in first aperture 663 and the second aperture insures that a track laying vehicle can be towed or can be parked on a steep grade without concern for track loosening.

As illustrated in FIG. 6, first cross pin location 662 is located proximate shoulder 445 and is spaced apart from back end 444 of idler plate 236 a distance 668. In one embodiment, distance 668 is approximately 0.60 inches. However, those skilled in the art should recognize that distance 668 can be other lengths as long as cross pin 666 is installed in first aperture 663 and the second aperture to restrict the tracks from loosening during operation as well as keep the tracks on track frame 110 if the track laying vehicle is not operating.

Figure 7:
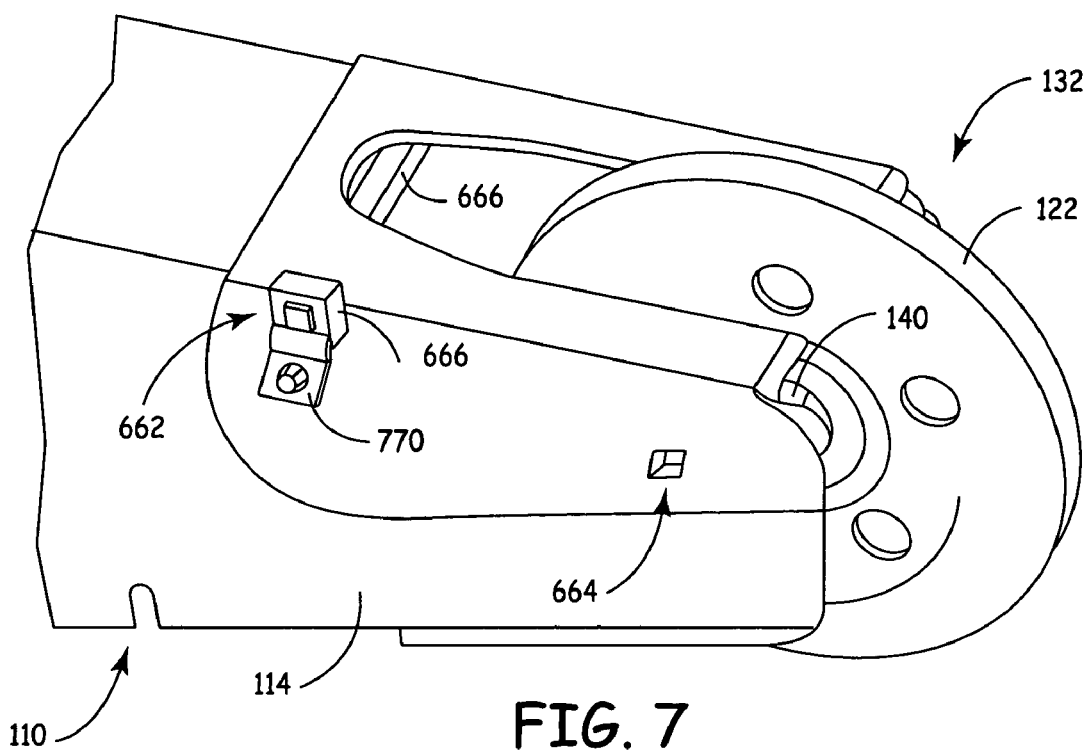
FIG. 7 illustrates an enlarged perspective view of a front idler assembly supported on side plates of a track frame.

FIG. 7 illustrates an enlarged side perspective view of front idler assembly 132 supported in side plates 114 of a track frame 110 in accordance with an embodiment of the present invention. As shown in FIG. 7, stop pin 666 extends between first aperture 663 (FIG. 6) and the second aperture of each side plate 114 and crosses rod 238 (FIG. 6) and idler plate assembly 134 (FIG. 6) perpendicularly. Cross pin 666 is held in place by a pin retaining clamp 770. Pin retaining clamp 770 is configured to maintain stop pin 666 in first aperture 663 and the second aperture while allowing the cross pin to have a small amount of movement in a direction 672 (FIG. 6). Direction 672 is the direction in which idler plate assembly 234 (FIG. 6) slides or moves.

Figure 8:
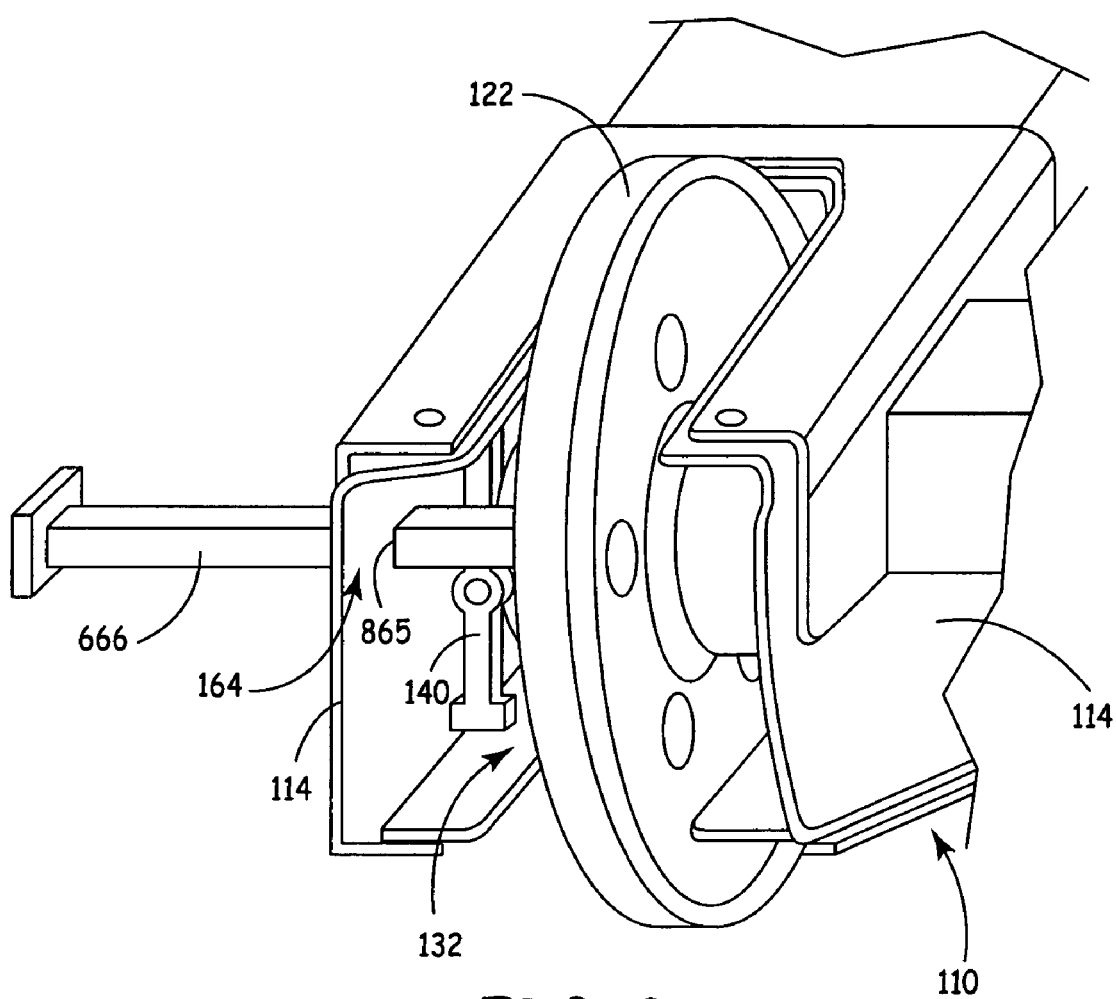
FIG. 8 illustrates an enlarged perspective end view of a front idler assembly.

FIG. 8 illustrates an enlarged perspective end view of front idler assembly 132 supported on side plates 114 of track frame 110 in accordance with an embodiment of the present invention. Second cross pin location 664 includes a third aperture 865 on one of the side plates 114. Although FIG. 8 illustrates third aperture 865 as being on the left side plate 114, it should be noted that aperture 865 can be included on the right side plate 114.

In FIG. 8, cross pin 666 is configured to be inserted into third aperture 865. With cross pin 666 inserted into third aperture 865, the tracks can be loosened and removed from the track laying vehicle for maintenance and servicing purposes. With the cross pin 666 in this aperture, hydraulic pressure can be applied and front idler assembly 232 will remain in the track removal location.

Third aperture 865 is located proximate idler roller 122. Cross pin 666 extends perpendicularly between one of the side plates 114 and idler roller 122 such that the cross pin can hold a retracted front idler assembly 132 away from the track while the track laying vehicle is running.

Although the present invention has been described with reference to preferred embodiments, workers skilled in the art will recognize that changes may be made in form and detail without departing from the spirit and scope of the invention.

What is claimed is:

1. A track tensioning assembly for a track laying vehicle including a track and a track frame having a pair of side plates, the track tensioning assembly comprising:

an idler plate assembly coupled to a hydraulic actuator at a first end and coupled to a front idler assembly at a second end, the hydraulic actuator configured to apply a pressure on the front idler assembly with the idler plate assembly;

a first location along the track frame located proximate the first end of the idler plate assembly;

a second location along the track frame spaced apart from the idler plate assembly and proximate to the front idler assembly; and a removable cross pin positioned in one of the first location and the second location on the track frame.

2. The track tensioning assembly of claim 1, wherein the removable cross pin is configured to prevent complete loosening of the track when the removable cross pin is positioned in the first location.

3. The track tensioning assembly of claim 1, wherein the removable cross pin is configured to allow removal and installation of the track when the removable cross pin is positioned in the second location.

4. The track tensioning assembly of claim 1, wherein the idler plate assembly comprises:
 a tube portion configured to engage a rod of the hydraulic actuator; and
 an idler plate coupled to the tube portion, the idler plate having a back end that forms a shoulder with the tube portion.

5. The track tensioning assembly of claim 4, wherein the first location of the removable cross pin is positioned proximate to the back end of the idler plate.

6. The track tensioning assembly of claim 4, wherein the first location of the removable cross pin is positioned proximate the shoulder of the idler assembly.

7. The track tensioning assembly of claims 4, wherein the first location of the removable cross pin is spaced apart from the back end of the idler plate by a distance.

8. The track tensioning assembly of claim 7, wherein the distance is approximately 0.60 inches.

9. The track tensioning assembly of claim 1, wherein one of the side plates comprises a first aperture and the other of the side plates comprises a second aperture, the removable cross pin configured to be inserted through the first aperture and the second aperture and be positioned perpendicular to a rod of the hydraulic actuator and the idler plate assembly when the removable cross pin is positioned in the first location.

10. The track tensioning assembly of claim 9, wherein the removable cross pin is held in the first and second apertures with a pin retaining clamp.

11. The track tensioning assembly of claim 9, wherein the pin retaining clamp is configured to allow the removable cross pin to move in a direction that the idler plate assembly slides.

12. The track tensioning assembly of claim 9, wherein one of the side plates comprises a third aperture, the removable cross pin configured to be inserted in the third aperture and oriented perpendicular to and proximate to the front idler assembly when the removable cross pin is positioned in the second location.

13. A track tensioning assembly for a track laying vehicle including a track and a track frame having a pair of side plates, the track tensioning assembly comprising:
 an idler plate assembly coupled to a hydraulic actuator at a first end and coupled to a front idler assembly at a second end, the hydraulic actuator configured to apply a pressure on the front idler assembly with the idler plate assembly;
 a track retaining position on the track frame located proximate the first end of the idler plate assembly;
 a track removing positioning on the track framed spaced apart from the idler plate assembly and proximate to the front idler assembly; and
 a removable cross pin located in one of the track retaining position and the track removing position on the track frame.

14. The track tensioning assembly of claim 13, wherein the track retaining position is located proximate a back end of the idler plate assembly.

15. The track tensioning assembly of claim 13, wherein the track removing position is located proximate an idler roller of the front idler assembly.

16. The track tensioning assembly of claim 13, wherein one of the side plates comprises a first aperture and the other of the side plates comprises a second aperture, the removable cross pin configured to be inserted through the first aperture and the second aperture and be positioned perpendicular to a rod of the hydraulic actuator and the idler plate assembly when the removable cross pin is positioned in the track retaining position.

17. The track tensioning assembly of claim 16, wherein one of the side plates comprises a third aperture, the removable cross pin configured to be inserted in the third aperture and oriented perpendicular to and proximate to the front idler assembly.

18. A track tensioning assembly for a track laying vehicle including a track and a track frame having a pair of side plates, the track tensioning assembly:
 an idler plate assembly coupled to an actuator at a first end and coupled to a front idler assembly at a second end, the actuator configured to apply a pressure on the front idler assembly with the idler plate assembly; and
 a removable cross pin positioned in a first aperture of one of the side plates and a second aperture of the other of the side plates when the removable cross pin is in a track retaining position on the track frame and the removable cross pin positioned in a third aperture of one of the pair of side plates when the removable cross pin is in a track removing position on the track frame.

19. The track tensioning assembly of claim 18, wherein the removable cross pin is held in the first and second apertures with a pin retaining clamp.

* * * * *

UNITED STATES PATENT AND TRADEMARK OFFICE
CERTIFICATE OF CORRECTION

PATENT NO. : 7,226,137 B2 Page 1 of 1
APPLICATION NO. : 10/985090
DATED : June 5, 2007
INVENTOR(S) : Corey L. Fornes It is certified that error appears in the above-identified patent and that said Letters Patent is hereby corrected as shown below:

Claim 13, column 6, line 12 Replace "positioning"
With --position--

Signed and Sealed this

Fourth Day of September, 2007

JON W. DUDAS
*Director of the United States Patent and Trademark Office*